C. A. GUSTAFSSON.
APPARATUS FOR ISSUING RECEIPTS FROM ELECTRICITY METERS, GAS METERS, AND THE LIKE.
APPLICATION FILED JAN. 7, 1920.

1,434,339.

Patented Oct. 31, 1922.
5 SHEETS—SHEET 2.

Inventor
C. A. Gustafsson

C. A. GUSTAFSSON.
APPARATUS FOR ISSUING RECEIPTS FROM ELECTRICITY METERS, GAS METERS, AND THE LIKE.
APPLICATION FILED JAN. 7, 1920.

1,434,339.

Patented Oct. 31, 1922.
5 SHEETS—SHEET 3.

Inventor
C. A. Gustafsson

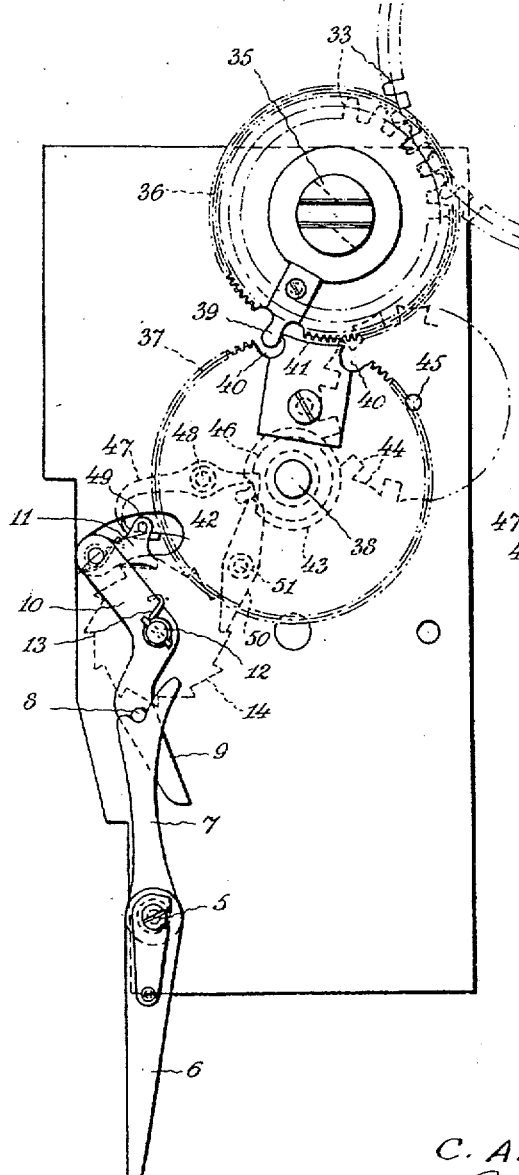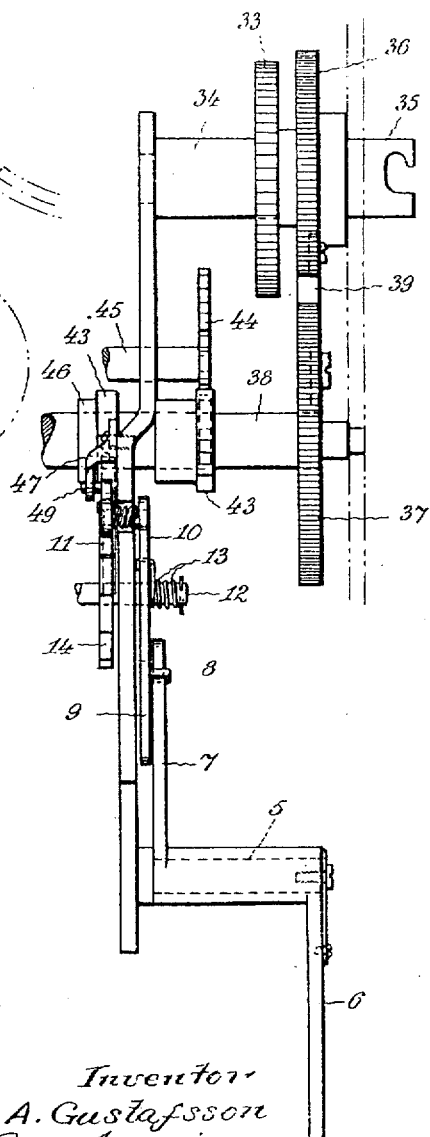

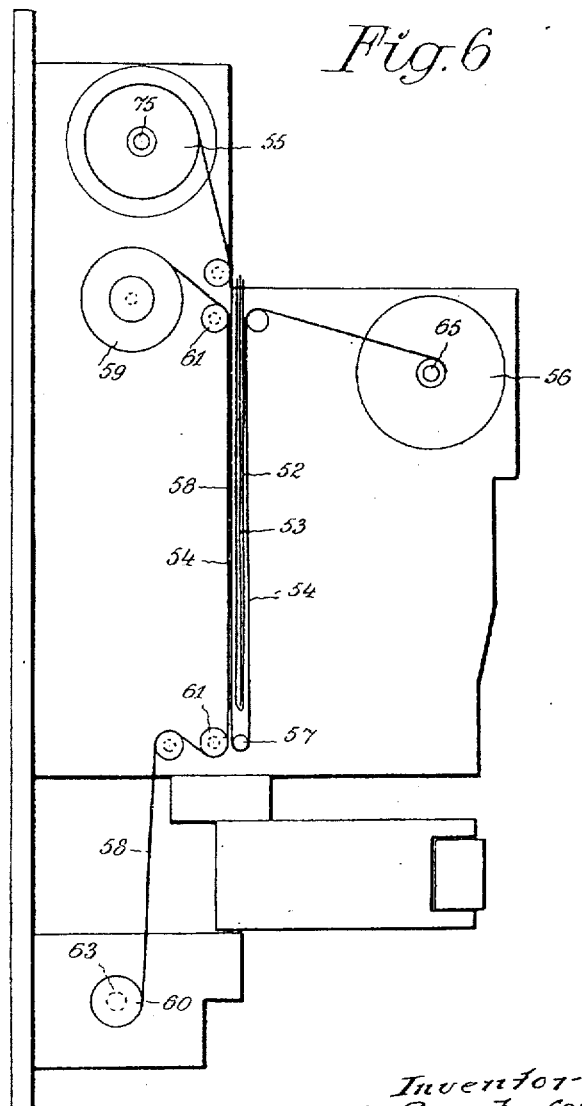

Patented Oct. 31, 1922.

1,434,339

UNITED STATES PATENT OFFICE.

CARL AUGUST GUSTAFSSON, OF MALMO, SWEDEN.

APPARATUS FOR ISSUING RECEIPTS FROM ELECTRICITY METERS, GAS METERS, AND THE LIKE.

Application filed January 7, 1920. Serial No. 349,891.

*To all whom it may concern:*

Be it known that I, CARL AUGUST GUSTAFSSON, a citizen of Sweden, residing at Malmo, in the county of Malmohus, Sweden, have invented a new and useful Apparatus for Issuing Receipts from Electricity Meters, Gas Meters, and the like, of which the following is a specification.

This invention relates to an apparatus for issuing receipts from electricity meters, gas meters and the like. In municipal electricity works and gas works, where a plurality of subscribers are attached to a common distributing network, very extensive book-keeping and checking systems are used for controlling the consumption of energy and for collecting of the debts, and the object of the present invention is to simplify these systems in order to save time and personnel. For the individual subscribers the invention also involves the advantage, that they at any time are in a position directly to read off the costs to be paid for the consumption up to a certain time without any knowledge of the apparatus carrying out the measuring proper of the consumption or of the manner of calculating the costs of the consumption. For this purpose the invention consists of an apparatus working in synchronism with the meter proper and mounted at the place of consumption, said apparatus being of such a construction that it will indicate the value of money corresponding to the consumption and also at any time issue a receipt for the amount, whereafter the money calculating apparatus automatically will be adjusted to zero.

Figure 1:
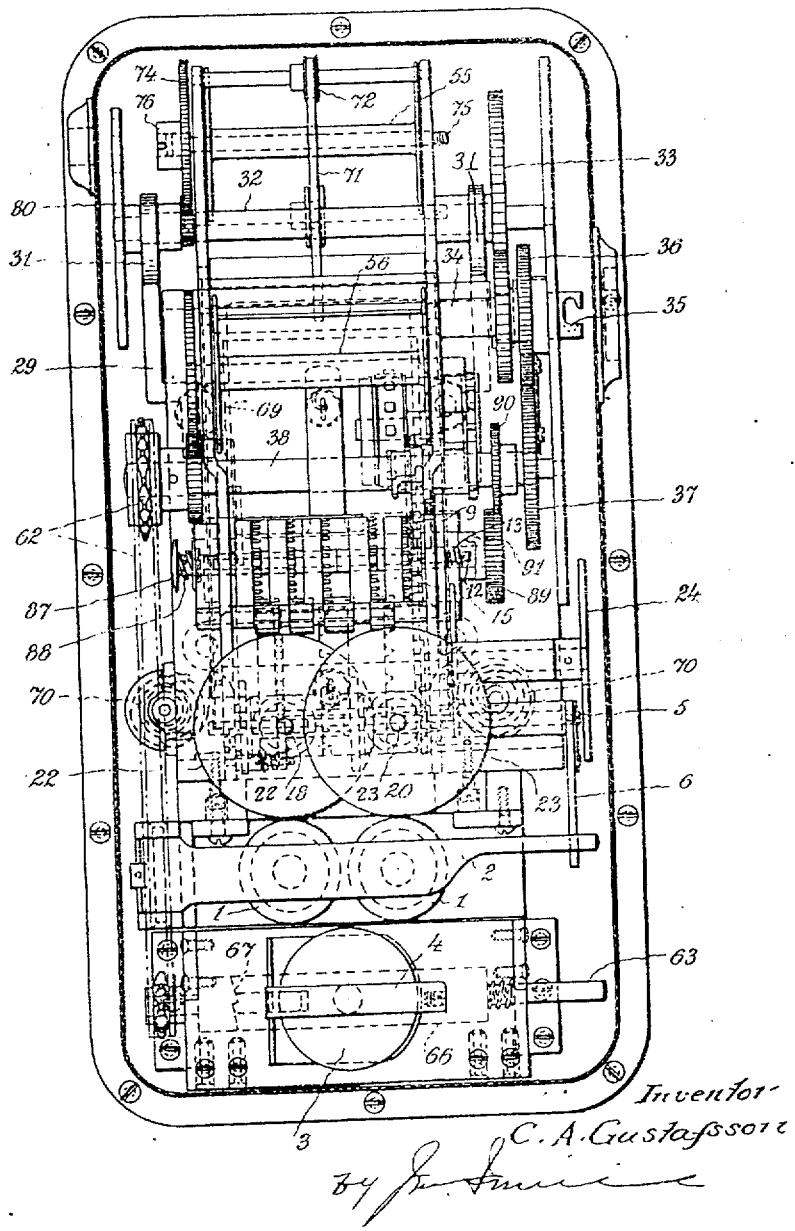
Figure 2:
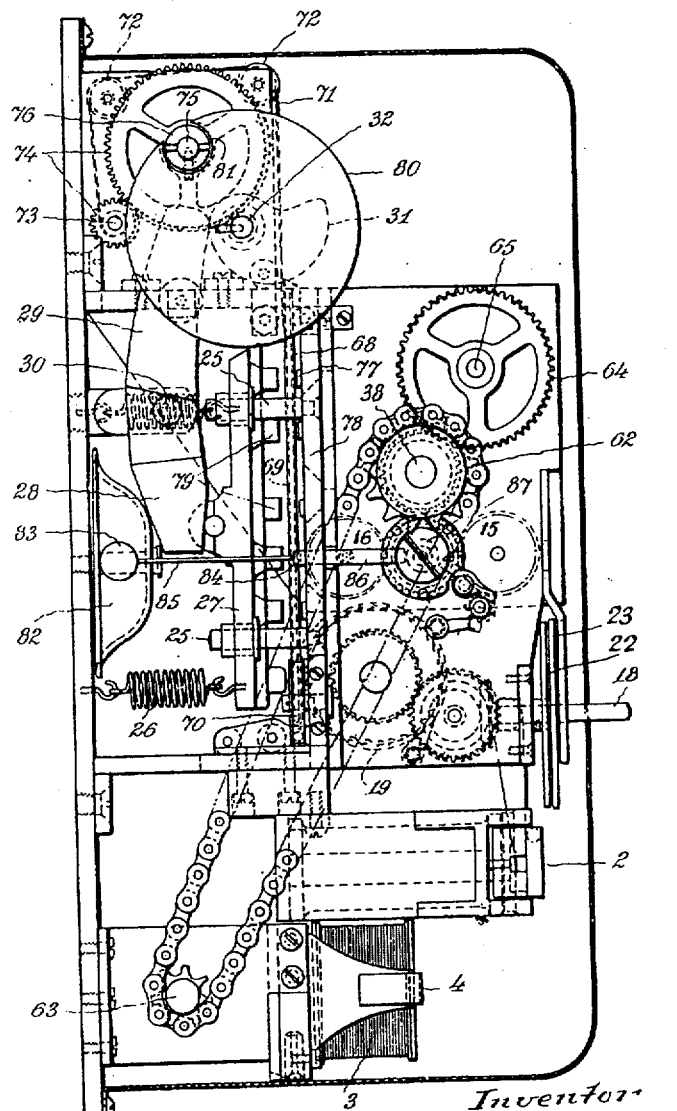
Figure 3:
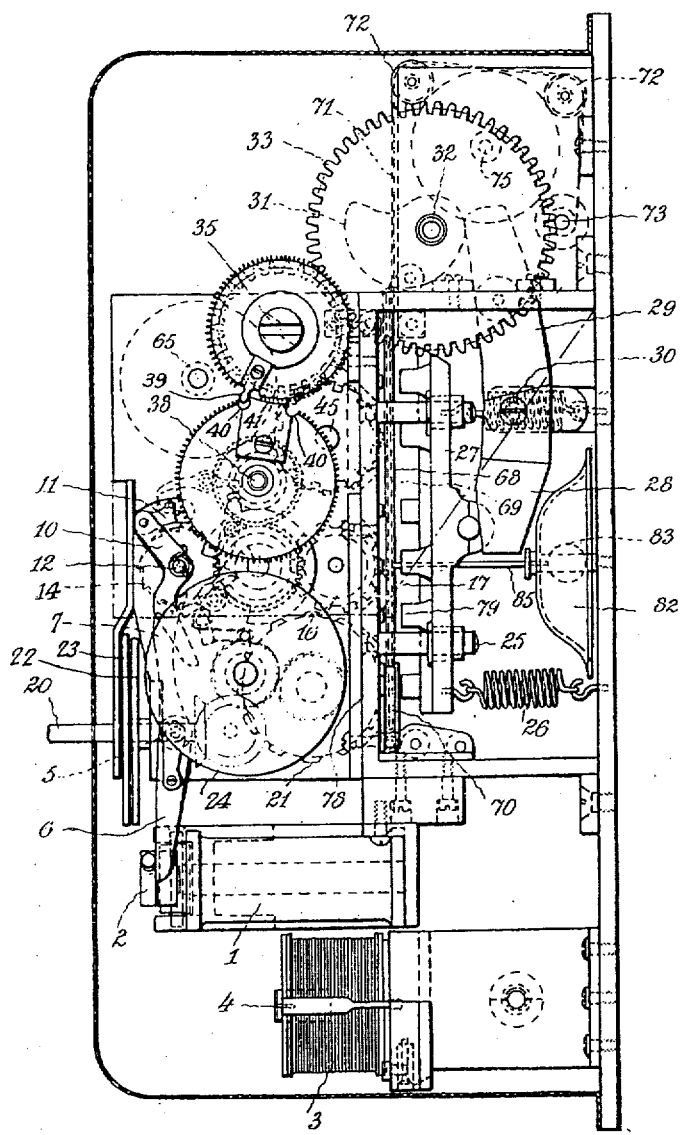

An apparatus of this kind must be of such a construction that it meets all requirements as to security of service and control both from the side of the electricity works and of the consumer, and it must also be protected against unathorized actions or mischief. Moreover the apparatus must be as simple as possible as well from the point of view of security of service as with regard to the cost of manufactur The invention is illustrated in the accompanying drawings, in which Fig. 1 shows a front view of the working parts of the apparatus, the casing having been removed. Figs. 2 and 3 are side views of the same seen from two opposite sides. Fig. 4 shows on a larger scale a detail side view of the mechanism for transmitting the synchronous movement from the meter, and Fig. 5 shows a front view of the same. Fig. 6 is a side view of the apparatus shown in outline and illustrating the method of operation.

All gearing and driving devices belonging to the apparatus may, of course vary in many respects, and they will only be described in detail in the following as far as is necessary for the clear understanding of the method of working. It is to be noted that the apparatus described in the following relates to the distribution of electric energy, but it is evident that an apparatus built on the same principle also may be applicable in combination with the distribution of gas, water or the like.

The apparatus shown relates to a motor supply meter for electricity. In meters of this type a plurality of rotating members, as known, are to be found, and one of them is connected with a switch. For this purpose the rotating member may for instance be provided with one or more contact brushes, which when passing a fixed contact during the rotation close a circuit through the receipt issuing apparatus. As all rotating members in the meter proper have a velocity that is directly proportional to the consumption, it follows, that the number of impulses given to the receipt issuing apparatus per unit of time also will be proportional to the consumption, and thus it is evident that the apparatus will work synchronously with the meter belonging to the same. As the consumer ought not to pay for the current that is used for the working of the receipt issuing apparatus the conduit leading to the same should be connected with the distributing mains before the meter. Then the meter will be charged with an increased consumption only in proportion as it is necessary for carrying out of the mechanical work of the switch, but of course this work is so insignificant that it practically is of no consequence with regard to the cost for the increased consumption.

A number of impulses or rushes of current corresponding to the amount of the consumption thus are given to the receipt issuing apparatus, which is to be driven by these impulses. For this purpose the rushes of current are led through an electro-magnet coacting with the movable armature which after attraction is released by a spring. The registering parts of the receipt issuing apparatus are acted upon by the movements of said armature. This electro-magnet with its armature is indicated by 1 and 2 in the drawing. In order to do away with the formation of sparks in the switch belonging to the meter the impulses are not admitted directly into the electromagnet, 1 but they serve only to operate a switch in the receipt issuing apparatus, which closes and breaks the current to the electromagnet 1. This switch consists also of an electromagnet 3 coacting with an armature 4 which closes the circuit to the electro-magnet 1 in any usual or preferred manner, detail of which is unnecessary to illustrate. The mechanical means for this are shown in the drawing but need not be described in detail as they can vary in many different ways.

The armature 2 is in the path of a lever 6 made to turn around a pivot 5, this lever being connected with another lever 7 in the path of which is a pin 8 carried by one arm 9 of a double armed lever, the other arm 10 of which carries a pawl 11. The lever 9, 10 is made to turn around a fixed axle 12 and it is acted upon by a spring 13 in such a way that it is carried back into its starting position and then also brings the lever 6, 7 back (Figs. 4 and 5). The pawl 11 coacts with a ratchet wheel 14 placed on the axle 12 which forms the main shaft in a counting apparatus 15 of an ordinary type indicating the cost of the consumption and having its numerals visible from the front side of the apparatus through holes in the casing. Thus when the pawl turns the ratchet wheel 14, the counting wheels are also turned in a corresponding way, and another counting apparatus 16 (Fig. 3) is arranged behind the first mentioned one and connected with the same by means of a suitable gearing in such a way that they are turned synchronously. The counting apparatus 16 has no numerals but instead common printing types 17, and when a numeral in the counting apparatus 15 is visible opposite the holes in the casing its corresponding type in the counting apparatus 16 will be turned inwards towards the bottom plate of the apparatus and a printing device placed between said plate and the counting apparatuses, as will be described in the following.

On the front side of the apparatus shafts reaching outside of the casing are provided, these shafts having handles for turning. One of the shafts 18 is connected with a type wheel 19 by means of a suitable gearing for indicating the date, and the other shaft 20 is in a corresponding way connected with a type wheel 21 for indicating the month. Both shafts 18, 20 carry discs 22 and 23, of which a portion is visible through a hole in the casing, and this portion corresponds to the type being in working position, i. e., facing the printing device at the moment. In the same way a disc 24 made to turn from the outside is connected with a type wheel for indicating the year, and also a portion of this disc is visible through a hole in the casing. Thus by adjusting these disc types for date, month and year may be turned to face the printing device, and at each payment for the consumption or issuing of a receipt these discs and types are turned in such a way that the date, etc., will be printed on the receipt.

The printing apparatus consists of a pad 27 slidable on guides 25 and acted upon by springs 26. The pad 27 coacts with one arm 28 of a double armed lever 28, 29 which is pivoted at 30, and the other arm 29 of the lever coacts with eccentrics or cams 31 carried by a shaft 32, at the turning of which the cams 31 act upon the levers 28, 29 in such a way that the pad 27 is pressed against the types of the date wheels and the types of the counting apparatus described above. After such a printing movement the pad is carried back to its starting position by the springs 26. The shaft 32 is driven from a shaft 34 by means of a suitable gearing, and on the end 35 of this shaft reaching outside the casing a loose crank carried by the collector may be fitted.

Instead of being turned by hand each time the type wheel for indicating the month may be connected with the pad 27 in a suitable way by means of a step mechanism in such a manner that the month type wheel and the disc coacting with the same are turned one step for each movement of the pad forwards and back, and thus a control of the collecting each month is established.

The gear ratio of the transmission mechanism 33 shows that the crank on the shaft 34 must be turned two revolutions for each printing operation, and during the latter of these revolutions the counting apparatuses (the numeral and type wheels) are reset to zero. For the sake of control however the issued receipt ought to be numbered, and this numbering is also performed by turning the crank. For this purpose a gear wheel 36 (Figs. 4 and 5) is mounted on the shaft 34, said wheel engaging in a wheel 37 mounted on another shaft 38. The wheel 36 however is not provided with uniform teeth along the whole circumference, as it has a larger tooth 39 coacting with two larger recesses 40 and an interposed smooth portion 41 on the wheel 37 in such a way that this wheel will be turned only one revolution for every other revolution of the wheel 36, while the shaft 38 will stand still during one of the revolutions of the shaft 34. On the shaft 38 a disc 43 provided with a large tooth 42 is mounted, said disc coacting with a toothed disc 44 mounted on a third shaft 45 in such a way that the shaft 45 will be turned one step for each revolution of the shaft 38, but this step is momentary and it takes place during a certain smaller portion of the revolution, and the shaft 45 is at a standstill during the rest of the revolution. A numbering type wheel (not shown) is provided on the shaft 45, and this wheel moves one step for each revolution of the shaft 38, i. e., for every other revolution of the shaft 34 or for each printing of a receipt. When payment is made once a month the type wheel on the shaft 45 needs only twelve different number types, but even if payment is made more frequently this number of types is sufficient, as the principal thing is only to establish that the receipts are numbered in unbroken succession.

As it is necessary for reasons easily accounted for to prevent a movement of the counting apparatuses during the printing operation and it easily happens that consumption is going on during such an operation, the counting apparatuses must be disconnected in one way or another, when printing takes place. It is true, that the consumer hereby gets energy for nothing during the time corresponding to the disconnection of the counting apparatuses, but as this time, as will be seen by the following, is very short, only a few seconds, it is evident that this trifling loss for the electricity works is of no consequence. For the disconnection of the counting apparatuses during the printing operation a disc 46 having a recess is provided on the shaft 38 (Figs. 4, 5). This disc coacts with a lever 47 made to rotate around a fixed pin 48 mounted on the pawl 11. When the disc 46 is at a standstill, the end of the arm 47 engages in the recess, but when the disc is turned, the arm 47 is turned by the other part of the circumference of the disc around the pin 48 in such a way that the pawl 11 is lifted out of engagement with the ratchet wheel and rests in this disengaged position during nearly a rotation of one revolution of the shaft 38. Even if consumption during this time takes place and the lever system 6, 7—9, 10 should be moving, the counting apparatuses will not be acted upon, while the pawl 11 is out of engagement with the wheel 14. It is however also desirable, that the counting apparatuses during the printing operation are locked in order to prevent them from turning back, and this is done by means of a pawl 50 pivoted at 51 and acted upon by the disc 46 in such a way that it ratchets during the printing operation and immediately thereafter is disengaged for resetting the counting apparatuses to zero, which must be done after each printing or issuing of receipts.

The receipt to be used in the apparatus, for which the collector brings blanks, consists of a rectangular piece of unprinted paper folded parallelly with one of its shorter edges in two equal parts, between which a carbon paper or other colouring paper is applied. In this way a receipt in two equal copies is obtained, the original of which is delivered to the consumer in exchange for the payment, while the duplicate is brought to the cash department by the collector for controlling purposes. Moreover, a third controlling receipt is printed and kept in the apparatus, this respect serving to control the collector from the side of the distributing station. This latter receipt is applied on a control receipt strip automatically moving in the apparatus in the manner described below. For printing the control receipt strip in the apparatus and for printing the original receipt an automatically fed ink ribbon is provided in the apparatus.

In Fig. 6 the devices for the receipt blanks and the inking ribbons are shown. The dotted line 52 indicates the double folded receipt blank and the heavier line 53 is the carbon paper applied between the two parts of the blank. 54 is the ink ribbon which is fed automatically from a supply roller 55 to a receiving roller 56 over a guiding roller 57 in such a way that it will be folded around the receipt blank. The control receipt strip is indicated by 58 and runs from a supply roller 59 to a receiving roller 60 over suitable guide rollers 61, which keep a part of it parallel with and close to that portion of the ink ribbon which is opposite to the receipt blank 52. It is evident that, if the pad 27 strikes the parallel parts of the receipts and the carbon ribbons and presses them towards the types, the types will be printed on the receipt blanks and on the control strip. The control receipt strip 58 is driven by a chain gear 62 from the shaft 38 to the shaft 63 of the receiving roller 60 (Figs. 1 and 2), and the ink ribbon 54 is in the same way driven from the shaft 38 by means of a gear 64 (Fig. 2) connecting said shaft with the shaft 65 of the receiving roller 56. In connection with these last mentioned devices means must be provided for carrying the ink ribbon back to the supply roller 55, after its entire length has been fed to the receiving roller, as it of course may be used several times in the same parts of the surface, and also a suitable device for inserting and removing of control receipts strips. For carrying the ink ribbon back a coupling is preferably used, by means of which the gear 64 can be released from the shaft 65 for the purpose of carrying the ink ribbon back by turning the shaft of the supply roller 55, and in order to be able to exchange the control receipt strip this strip ought to be wound on spools 66 (Fig. 1) which may be connected with the shaft 63 by means of couplings 67. One end of the shaft 65 is acted upon by a spring and arranged to be pulled out longitudinally in such a way that it can be disconnected from the spool 66, whereafter the latter can be removed for exchange.

For the inserting of the receipt blanks 52 a frame 69 slidable in guides 68 is provided, said frame being open upwards and having its two side pieces U-shaped in cross-section in such a way that they form a guide for the receipt blanks inserted in the frame. The frame is pulled downwards in the working position shown in the drawing by means of springs 70 from which position it can be pulled upwards by means of a band 71 fastened to the upper edge of the frame and preferably elastic. This band is carried over a number of rollers 72 fastened at the upper end of the apparatus to a shaft 73, upon which the band 71 can be wound. The shaft 73 can be turned by means of a gear 74, the one wheel of which preferably is mounted loosely on the shaft 75 carrying the supply roller 55 for the ink ribbon 54. The gear wheel fastened on the shaft 75 has a hub 76 (Figs. 1 and 2) provided with means for fitting a crank loosely onto the same, said crank being brought by the collector of the payments. After applying this crank (not shown) the shaft 73 is turned and the band 71 wound on thereby lifting the frame 69 towards an opening in the casing at the upper part of the apparatus so that the receipt blanks may be introduced into the frame 69 through the opening at its upper end. When the receipt blanks in this way have been inserted in the frame the latter is carried back into its working position, i. e., into a position between the pad 27 and the types.

When it is desirable on the receipt to indicate also the number of the meter or other similar date showing to which place of consumption a certain issued receipt belongs, fixed types ought to be provided on a level with the types provided on the counting apparatus and the date wheels, etc., which latter types are in working position, i. e., facing the pad 27. These fixed types indicate the number of the meter, etc., and such a type is shown at 77 in Fig. 2. It is mounted on a frame plate 78 parallel with the pad 27, said frame plate serving as guide for the movable types, which are in working position, and preferably carrying also other fixed types, such as "$" and "cents" close to the movable types belonging to the counting apparatus. As the receipt blanks always have one and the same position in the apparatus the last mentioned types may be omitted, if a specification regarding the value of the printed figures is printed in advance on the receipt blanks. In order to get a uniform printing without unnecessary wearing of the types the pad 27 ought to be provided with a number of soft striking surfaces, for instance projections 79 of rubber, and then the device described works essentially as a stamp.

In order to prevent an unprinted receipt from being removed from the apparatus a disc 80 is provided on the shaft 32, which is turned by the gear 35 from the shaft 34 and carries the cams 31. This disc is large enough to cover the hub 76, and it has an opening 81 (Fig. 2), which is situated opposite to the hub 76, when the apparatus is in its working position, as shown in the drawing, so that the hub may be accessible from the outside of the casing for applying a crank for turning of the gear 74. This disc is turned during the printing operation in such a way, that it covers the hub 76 and makes the same unaccessible from the outside, wherefore the receipt blanks cannot be removed until the printing operation is finished, when the opening 81 again is opposite to the hub 76 making the same accessible.

In order to signify that a printing operation is finished, i. e., that the apparatus after such an operation again is in the starting position shown in the drawing, a signalling device is provided, said device being necessary, while the working parts of the apparatus are not visible from outside. This signalling device may of course be carried out in many different ways and consists for instance of a coloured disc partly visible through an opening in the casing, said disc being turned by any of the movable members of the apparatus in such a way, that it shows a certain colour through the opening in the casing, when the apparatus is in its starting position, that is to say an optical indicator may be used in some way or other for this purpose. Another form is shown in the drawing when the signalling device consists of a bell 82 and a clapper 83 coacting with the same (Figs. 2 and 3). The clapper is pivoted at 84 (Fig. 2) and forms a double armed lever acted upon by a spring, whereat the one arm 85 carries the clapper proper and the other one 86 is in the path of a pin 87 (Fig. 1) which is mounted slidably in the longitudinal direction and acted upon by a spring 88 in such a way that it is kept in the position shown in the drawing. This pin is also connected with a gear wheel 89 engaging in another wheel 90 on the shaft 38, and a tooth 91 is fixed on the hub of the wheel 89, said tooth coacting with a corresponding recess in a sleeve fastened to the frame work carrying the moving parts. When the shaft 36 in printing of a receipt is turned, the wheel 89 is turned and the tooth 91, which is provided with an oblique and axially disposed surface, will then be pressed out of the fixed recess, so that the pin 87 is moved longitudinally against the action of the spring 88. When the function of the apparatus is totally finished, the wheel 89 has turned one complete revolution and the straight side of the tooth 91 will be opposite to the straight side in the recess, whereafter the spring 88 again can act freely upon the pin 87, which thereby is quickly carried back to its starting position and transmits a blow to the clapper acting upon the bell 82, so that the sound herefrom indicates that all parts have returned to their starting position.

The movement of the pin 87 above mentioned and its turning by means of the gear 89, 90 serve also to reset the counting apparatuses to zero, as the pin serves as shaft for those gear wheels, which connect the wheels of the ordinary counting apparatus with the type wheels of the other counting apparatus and cause the latter to follow the former synchronously. The gear wheels are made to turn freely on the said pin and they are also connected with coupling discs on the pin. When the pin is moved longitudinally the gear wheels are connected with the same, and when it is turned the counting apparatuses are reset to zero in a known way. When the zeroizing device is constructed in the manner described above in combination with those gear wheels, which connect the two counting apparatuses, the resetting to zero will of course take place simultaneously and uniformly in them both. These devices are pointed out only as examples showing in what way the resetting to zero can take place and their detail construction are not shown in the drawings, but their method of working is made clear by the above description. The details may be subject to variations in different ways. The counting apparatuses need not be described in detail as they are of the kind commonly used in electricity meters, in which the different wheels are connected with transmission devices in such a way that when a wheel has been turned nine steps it will turn next wheel one step whereafter this latter wheel is turned nine steps and then turns the next wheel one step, etc. It is however to be noted that the counting apparatus which carries the types also may be of another type without gearing between the separate type wheels, if each of the latter is connected with the corresponding wheel in the other counting apparatus by means of a special gearing. Thus the type apparatus may consist only of type wheels which are driven synchronously with the wheels in the counting apparatus proper and of course also reset to zero synchronously with the same. The type apparatus may however also consist of a counting appartus as firstly described and in this case only a gearing between the wheels of the lowest order in both counting apparatuses is needed, while the other wheels in the type apparatus are driven from each other with gearing ratios of 1:10. In this case however more complicated zeroizing devices are needed. In order to simplify the construction the gears 1:10 in the type apparatus therefore may preferably be left out, and this apparatus may consist of separate type wheels driven synchronously and with separate gears for each wheel directly from the counting apparatus proper.

When the apparatus is to be used for issuing receipts for consumed gas or water it is combined with a common gas or water meter, which, when a certain quantity, for instance one cubic metre has been measured, by means of a valve connected with the counting apparatus of the meter and driven by the same sends an impulse of the fluid to a membrane, a piston or the like, which in this way is moved and acts upon the lever devices 6, 7—9, 10 in the same way as described above. In this case the electrically working details (1—4) of the apparatus may be omitted.

The method of working of the apparatus is as follows: The collector sent out from the distributing office, who brings with himself double folded receipt blanks, carbon papers or colouring ribbons and two cranks necessary for putting the apparatus into function, reads off for his own control the amount corresponding to the cost of the consumption and may eventually make a note of this item together with the number of the meter or the consumer in a cash-book. Then he adjusts the date, the month and the year on the corresponding type wheel by turning the discs 23, 22 and 24. An adjustment of the month type wheel however is not necessary if this takes place automatically at the movements of the printing pad 27 in the manner described above. After this adjustment the crank is put on the hub 76 and the gear 74 and the shaft 73 are turned in such a way that the receipt frame 69 by means of the band 71 is raised towards an opening in the upper part of the casing, whereafter a double folded receipt blank with an interposed colouring paper is put into the frame, which latter when the crank is left hold of, again is carried downwards between the pad and the types by means of the springs 70. Before any further manipulations are made it is important to remove the crank from the hub 76, as a movement of the printing device and other parts of the apparatus is not possible as long as said crank is fastened to the hub 76, because the crank is inserted through the opening 81 in the disc 80 thus preventing the latter from rotating. In order to avoid breaking down of the apparatus, if the crank from forgetfulness has not been removed, it is to be recommended not to provide the collector with more than one crank which in this case must fit the hub 76 as well as the end of the shaft 85, and it is to be noted that the fastening mechanism of this crank must be of a rather complicated nature, so that not any crank of a common type does fit in the apparatus. The crank must also be so constructed that it allows turning of the crank only in one direction, while it slips off the shaft when somebody tries to turn it in the opposite direction. When the crank has been removed from the hub 76 it (or another crank) is placed on the end of the shaft 35 and the shaft 34 is turned round two revolutions. During the first revolution the printing takes place and during the other one the resetting to zero. At the beginning of the first revolution the pawl 11 is released and the counting apparatuses with the type wheels belonging thereto are locked at the same time as the shaft 32 begins to rotate, and the cams thereon cause the pad 27 to move. Thus the pad presses the receipts against the types and after a turning of the shaft 34 one revolution the cams 31 are in such a position, that the pad 27 will be thrown back to its starting position by means of the springs 26 after printing. At the next revolution of the shaft 34 the type wheel is turned for indicating the number of receipt so that a new number takes the place of the former one. The control receipt strip is turned in such a way that a part of the same not used is placed opposite to the printing place, while the portion last printed is wound on the receiving roller 60. The ink ribbon 54 is fed forwards a little way and the counting apparatus is reset to zero. At the end of the second revolution of the shaft 34 the pin 87, which does not begin its movement until the beginning of the second revolution of the shaft 34, has been turned one complete revolution by the wheel 89, and as soon as this revolution is completed, a signal is made in the manner described above. Then the shaft 32 has also turned one complete revolution, and the recess 81 is again opposite the hub 76. At the beginning of the second revolution the pawl is released from the ratchet wheel 14, and at the end of the same revolution the pawl 11 is put into engagement with the same, whereafter the apparatus again is ready for registering the cost of the consumption. Thus there is no registering of the consumption during the time necessary for turning the shaft 34 two revolutions, but as this can be done easily in a couple of seconds, it is evident that the trifling loss to the distributing works caused hereby is of no consequence, if energy really is consumed during the time when the receipt is issued. If no such consumption takes place there will be no loss. After the shaft 34 has been turned two revolutions and the signalling device has indicated that the work is finished in the apparatus, it ought to be controlled by a repeated reading, that the counting apparatus really has been reset to zero, the crank is removed from the shaft end 35 and again put on the hub 76, whereafter the receipt frame is drawn upwards again in the manner described above and the receipt is withdrawn together with the interposed carbon paper, which latter of course may be used several times. The printed receipt, which preferably is perforated in the fold, is divided in two equal parts, one of which is a true copy of the other one. One of the receipts is handed over to the consumer at the payment for the consumption and the other one is brought by the collector to the office for controlling and bookkeeping purposes. For the sake of control the readings made and noted by the collector may also be summed up and compared with the sums on the duplicates of the receipts. Except the two receipts thus removed from the apparatus there is a third receipt on the control receipt strip which is inaccessible to both the collector and the consumer, and by this respect the collector is controlled from the side of the office, as of course all the duplicates delivered by him to the office and belonging to a certain meter must fully correspond to the control receipt strip for the same meter, and the control receipt strip can for instance be exchanged once or twice a year by another official and delivered by him to the office for controlling. The control is sharpened by the numbering of the receipts and the automatic adjustment of the indication of the month on the receipts. By the numbers it is easy to control that all the receipts belonging to a certain meter are accounted for by the collector, and by the automatic registering of the months it may be controlled that the time between two successive collectings does not become too long. If there is no consumption during a certain month a receipt ought to be drawn out anyhow in order to show that the consumer has no debt. Such a receipt shows of course only zeros.

The apparatus makes it possible to the consumer at any time directly to find out how much he owes to the electricity works, simply by looking at the counting apparatus proper. The counting apparatus is inaccessible to adjustment by hand for fraudulent purposes from the side of the collector or the consumer, and the only manipulation that can be made by the former is a resetting to zero, but such a manipulation is inevitably preceded by a printing of a receipt, at least on the control receipt strip, if the double folded receipts are not inserted in the apparatus. The consumer pays, of course, nothing if he gets no receipt, and the collector cannot furnish any receipt without it being registered on the control receipt strip. If the consumer should try to reset the apparatus to zero without inserting of receipt blanks, i. e., only by turning the shaft 34, the opening in the casing through which the shaft 35 is accessible, may be closed by the collector by means of a cover with lock, but this is unnecessary, while the collector at next collecting after such a manipulation directly finds out by the number on the issued receipt (or by the indication of month) that cheating has occurred, and it is evident that he must denounce the same since he is himself unable to account to the office as he is unable to present one number of receipts. Thus any attempt at cheating can easily be discovered.

I claim as my invention:

1. In an apparatus of the character stated, the combination of a common counting apparatus synchronously driving another counting apparatus provided with type wheels, a printing pad movable by means of a crank and a gearing, a frame for receiving receipt blanks being movable between the type wheels and the pad, the frame for the receipt blanks being connected at its upper end with a band fastened to a shaft which is provided with a fixed gear wheel engaging in another gear wheel on another shaft (75) and having a hub for receiving a crank, by means of which the gear and the first mentioned shaft (73) may be turned for moving the frame, a disc (80) being provided on the cam shaft (32), said disc covering the hub (76) of the other shaft in such a way, that the latter becomes inaccessible, and having an opening (81) opposite the hub (76) making the same inaccessible for receiving the crank, when the apparatus is not in working position.

2. In an apparatus of the character stated, the combination of a common counting apparatus synchronously driving another counting apparatus provided with type wheels, a printing pad movable by means of a crank and a gearing, a frame for receiving receipt blanks being movable between the type wheels and the pad, the crank shaft driving the printing pad being connected with a shaft (38), by means of a suitable gearing (36, 37) the latter shaft being connected with a pin (87) by means of another gearing (90, 91) for resetting the counting apparatus to zero in such a way that, when the crank shaft (34) is turned a certain angle (two revolutions), the other shaft (38) and the pin (87) are turned one half of said angle (one revolution) said latter turning being effected during the latter part of the first mentioned turning.

3. In an apparatus of the character stated, the combination of a common counting apparatus synchronously driving another counting apparatus provided with type wheels, a printing pad movable by means of a crank and a gearing, a frame for receiving receipt blanks being movable between the type wheels and the pad, the numeral wheels of the counting apparatus being connected with the type wheels by means of interposed gear wheels, which are made to turn freely on their shaft and provided with a part of a coupling coacting with a part of a coupling fastened on said shaft which is movable longitudinally, said movement being effected by turning the gear wheel (89) fastened to said shaft and said coupling including a projection (91) coacting with a corresponding fixed recess.

4. In an apparatus of the character stated, the combination of a common counting apparatus synchronously driving another counting apparatus provided with type wheels, a printing pad movable by means of a crank and a gearing, a frame for receiving receipt blanks being movable between the type wheels and the pad, the numeral wheels of the counting apparatus being connected with the type wheels by means of interposed gear wheels, which are connected with their shaft by means of a coupling, said shaft being slidable longitudinally and acted upon by a spring (88) which normally carries the same back to its starting position, said shaft also coacting with an acoustic signalling device (a bell) giving a signal as soon as the pin is carried back by the spring.

5. A receipt issuing apparatus for meters registering consumption of electricity, gas, or the like, comprising a counting apparatus adapted to be operated through the use of the metered agent, a second counting apparatus operated by the first counting apparatus and including type wheels, a printing pad to cooperate with the type wheels, manually operable mechanism from outside the apparatus for actuating the printing pad, a blank receiving frame movable between said pad and counting apparatus having type wheels, and means for locking the manually operable mechanism against access when the parts are not in working position.

6. A receipt issuing apparatus of the type described, comprising synchronously operated counting apparatus, one of which is provided with type wheels, a printing pad, a blank frame movable between the type wheels and the pad, a lever for actuating the printing pad, a cam for actuating the lever, gearing for actuating the cam, a removable crank shaft for actuating the gearing, and a disc having an opening to admit application of the crank, said disc being operated in the printing operation to dispose said opening out of position to permit application of the crank to thereby prevent the use of the crank during the printing operation.

7. In an apparatus of the character stated, a casing, a counting apparatus including a part visible through the casing and a part adapted for printing, a frame for receiving receipt blanks movable into an operative relation with the part of the counting apparatus adapted for printing, means accessible from beyond the casing for moving the frame, and a disc operable in the movement of the machine and formed with an opening adapted to permit access to said means only when said opening is aligned with said means.

8. A receipt issuing apparatus including a casing, a counting apparatus, means mounted in the casing for imparting a step-by-step movement to said apparatus, a pressure pad whereby an imprint may be taken from said apparatus, manually operable means for actuating the pressure pad, and mechanism actuated by said manually operable means for preventing cooperation of the counting apparatus and the step-by-step means during actuation of said manually operable means.

9. A receipt issuing apparatus, including a casing, a counting apparatus, means mounted in the casing for imparting a step by step movement to said apparatus, manually operable mechanism, a disc actuated in the operation of such mechanism, and means actuated in the movement of the disc to prevent the step by step movement during actuation of the apparatus under manually operable means.

10. A receipt issuing apparatus, including a casing, a counting apparatus, means mounted in the casing for imparting a step by step movement to said apparatus, manually operable mechanism, a disc actuated in the operation of such mechanism, said disc being formed with a notch, and a lever controlling said step by step means, said lever being operated by the disc in rotation to prevent operation of the step by step means and being adapted to seat in said notch in the disc when the disc is at rest to permit operation of said step by step means.

11. A receipt issuing apparatus, including a casing, a counting apparatus, means mounted in the casing for imparting a step by step movement to said apparatus and including a pawl for manually operable means for actuating the apparatus, a disc formed with a notch movable in the actuation of said manually operable means, and a lever formed to engage the pawl and cooperate with said disc, said lever being operated by the disc in movement to hold the pawl inoperative and being adapted to engage in the notch in the disc when the disc is at rest to permit operative movement of the pawl.

In testimony whereof, I have signed my name to this specification in the presence of two subscribing witnesses.

CARL AUGUST GUSTAFSSON.

Witnesses:
 T. G. Branzen,
 Gunhild Petersson.